Patented June 16, 1931

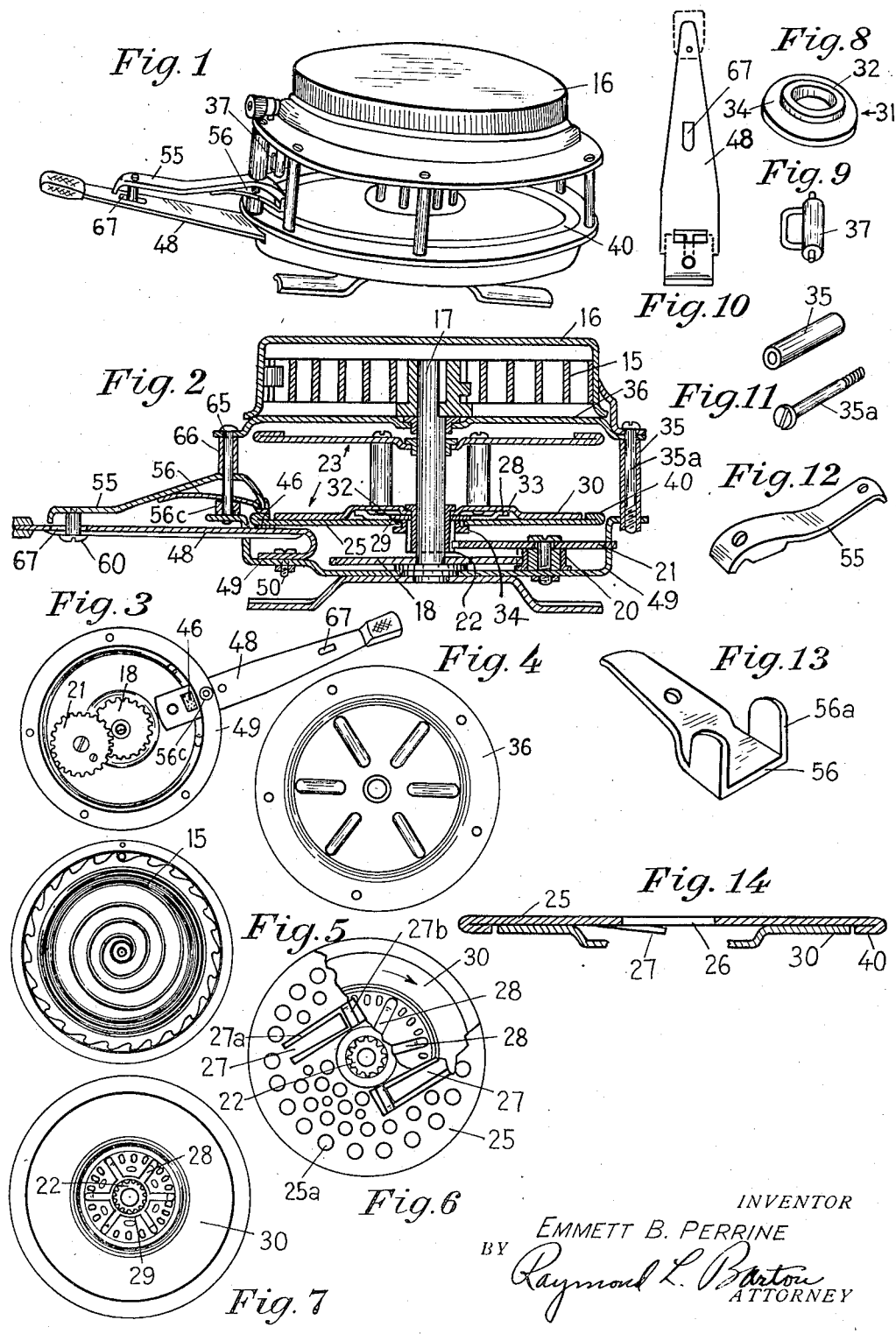

1,810,573

UNITED STATES PATENT OFFICE

EMMETT BURGESS PERRINE, OF LOS ANGELES, CALIFORNIA

AUTOMATIC FISHING REEL

Application filed December 17, 1928. Serial No. 326,490.

This invention relates to an automatic fishing reel which embodies, among other improvements, an improved brake mechanism for controlling the operation of the spring actuated line spool.

More specifically, the invention relates to a distinct improvement upon a type of automatic fishing reels now on the market wherein a brake is provided so arranged as to hold the line spool from turning in either direction until such brake is released by hand pressure. This necessitates the continuous operation of the brake by the hand while holding the rod as the line is played out by the other hand.

In order to operate existing automatic reels of this type, it is therefore necessary to exercise considerable skill in handling the line, because the movements of the hand must be in proper order as follows: First, the line must be grasped with the hand which is not engaged in holding the rod, then the brake must be released with the same hand that is holding the rod, then the line must be drawn out, the brake being reset whenever the hold on the line is released. This method must be closely followed. If the brake is released before grasping the line, the coil spring will wind the line in when it is not desired to do so, and the same thing will happen if the hold on the line is released before the brake is set. Also, if an attempt is made to draw the line out before the brake is released an unpleasant result is produced. Hence, in operating the type of fishing reels alluded to considerable skill and close attention is required and unpleasant results often occur which lessen the pleasure of the sport.

My newly invented fishing reel obviates the necessity of performing the difficult series of operations which have been mentioned, by constructing the line spool so as to operate free from the brake when playing out the line, the brake being employed when desired to keep the line from being drawn in.

Referring to the accompanying drawings which illustrate a preferred embodiment of the invention, Figure 1 is a perspective view of the complete device.

Figure 2 is a central cross-section thereof.

Figure 3 is a detailed plan view of the brake lever showing also some of the parts with which such lever cooperates.

Figure 4 is an inside face view of one of the housing plates for the spring.

Figure 5 is an inside face view of the spring housing and spring.

Figure 6 is a side view showing the spool with the brake plate attached, a portion of said plate being broken away in order to show a spider which cooperates with said spool and plate.

Figure 7 is a view similar to Figure 6, but completely omitting the brake plate.

Figure 8 is a perspective view of the brake plate collar.

Figure 9 is a perspective view of the line guide.

Figure 10 is a face view of the brake lever.

Figure 11 is a perspective view of one of the spacing sleeves and bolt therefor.

Figures 12 and 13 are respectively perspective views of an auxiliary lever and of a brake shoe which cooperates therewith.

Figure 14 is a mid-cross sectional view of my improved brake plate showing also a portion of the spool reconstructed to cooperate therewith.

Referring in detail to the drawings, describing briefly that portion of the construction which is well known and to which my invention is applied, the main spring 15, enclosed in a housing 16, is attached at its center or inner end to one end of a main shaft 17, the other end of said shaft 17 having secured thereto a primary gear wheel 18 in mesh with a pinion 20 having fixed thereto an intermediate gear 21 in mesh with a toothed element 22 frictionally attached to the line spool 23 and loosely mounted on shaft 17 to revolve thereabout.

In the foregoing well know construction, the braking device is applied directly to the line spool, with the result that when the brake is in the operative position, said spool is positively held against rotation in either direction; but in my invention the braking device controls a rotary element which is connected with said spool by a ratchet means, whereby said spool is permitted at all times to rotate free of braking interference while the line is being drawn out, said ratchet means at all times opposing the reverse rotation of said spool with relation to said rotary element. Otherwise the general operation of my improved device is the same as that of other fishing reels of the same class.

To secure the improved functional performance just stated I provide a rotary brake disk 25 having near its center and on opposite sides of its shaft opening 26, the two cooperating ratchet pawls 27 which engage the fingers 28 of a spider-ratchet 29 in order to permit said disk to rotate independently of said spider-ratchet in one direction only.

The fingers 28 of said spider-ratchet 29 have a frictional engagement with the adjacent side plate 30 of the spool 23.

The brake disk 25 is provided around its periphery with an inturned marginal flange 40 on its upper side as seen in Fig. 2. This marginal flange 40 of brake disk 25 forms a protecting border for the flange 30 of spool 23 and thus prevents the line from slipping in between spool flange 30 and the brake disk 25.

The brake disk 25 is held in contact with spool plate 30, and with the intermediate spider 29, by means of a collar 31 shown in detail in Fig. 8. Said collar slips over and is brazed to said gear 22. Said collar has a flange 32 which fits within the opening 26 of the brake disk 25 to hold spider 29 against the recessed portion 33 of plate 30, and also has a flange 34 which underlies the adjacent surrounding portion of brake disk 25.

Among parts well known in the art, but which should be briefly referred to, are the spacers 35 and spacer bolts 35a which connect together plates 49 and 36. Also the combination spacer and line guide 37 shown in Fig. 9.

In order manually to control the rotational movement of the spool for drawing the line in, the marginal portion of the brake disk is gripped or released as desired by a manually operable braking device comprising a main brake lever 48 secured to the casing wall 49 at its backwardly bent inner end by means of a screw 50 and arranged to frictionally engage and disengage the marginal portion of brake disk 25 opposite to its flange 40, and an auxiliary brake lever 55. It is to be understood that this braking device operates so as to grip or to release between its arms 48 and 55 the marginal portion of the brake disk 25. Lever 55 has a shoe 56 therebeneath to press upon or to release with relation to the upper surface of said flange 40 and lever 48 has a pad or shoe 46. A headed screw bolt 60 that is screw mounted on the auxiliary lever 55 projects through an elongated recess 67 formed in the main lever 48 to cause the lever 55 to be rocked when the lever 48 is rocked. Auxiliary lever 55 is fulcrumed upon an upstanding pin 65 which passes loosely through an opening in said lever, said lever being normally held yieldingly against the end of a sleeve 66 on said pin 65 by the spring pressure of the brake shoe 56 thereagainst, said brake shoe resting between its ends upon collar 56c. Said shoe 56 also has quite a loose fit around pin 65, and has upstanding ears 56a which pass astride auxiliary lever 55 to keep it in place. The inner end of said brake shoe engages the flange 40 of the brake disk.

As shown in Figure 6 the rotary brake disk 25 is preferably provided with a number of perforations 25a for lightening same, and its ratchet pawls 27 are formed by cutting out at each side thereof the slots 27a and also cutting away parts of the disk at 27b opposite the ends of said ratchet pawls 27. It is to be understood that said disk 25 is formed of resilient, relatively thin material and the ratchet pawls or tongues 27 are deflected downwardly when the disk is stamped out, in order to enable them to perform their ratchet function. The dogs or pawls 27 thus formed cooperate with the fingers 28 of the spider 29, said spider being in frictional engagement with the line spool.

In operation, the brake is normally on and is holding the brake plate 25 from turning in either direction. The spool being connected to this brake plate 25 by the ratchet means, is free to rotate in the direction for drawing the line out except for the resistance to said rotation of the main spring for winding the line in. Hence it will be seen that, while playing the line out, it can be drawn out free from any braking resistance without operating the brake lever, but when it is desired to draw the line in, the brake lever is depressed and the coil spring revolves the spool to wind the line thereupon.

In conjunction with the improved operation which has just been described as resulting from my improved construction, I retain the well known construction which permits the spool to slip on its driving pinion in case the line is farther drawn out after the main spring has been completely wound up.

It will be seen that by the construction which I have described, there is combined with the rotary spool, another rotary element rotatable about the same axis as said spool, to which the braking device is applied.

I claim:

1. In an automatic fishing reel, a line spool having a circular end plate, a brake plate having a marginal flange turned down upon one face thereof, the internal diameter of said flange being such as to permit it to surround the periphery of said end plate when said end plate and brake plate are juxtaposed, manually operable braking means adapted to grip and to release the marginal portion of said braking disk, and a spider element interposed between said end plate of said spool and said brake plate, said spider being in frictional engagement with said end plate and there being a ratchet-connection between said brake plate and said spider.

2. In an automatic fishing reel, the combination of a rotatable spool, a rotatable member, a ratchet device between said member and said spool which causes said member to rotate when said spool rotates in the direction to wind the fishline on said spool and which permits independent movement between said member and said spool when the latter rotates in the reverse direction, and a hand-operable brake associated with said rotatable member.

3. In an automatic fishing reel, the combination of a line spool, a motor spring, a train of gears connecting said spring with said spool, a rotary element concentric with said spool, means interposed between said element and said spool opposing the relative rotation of said spool in the direction only in which it is driven by said spring, and a hand-operable brake associated with said rotary element.

4. In an automatic fishing reel, the combination of a line spool, a motor spring, a train of gears connected with said spring, a frictional connection between said gears and said spool, a rotary element concentric with and having ratchet connection with one of said gears for opposing relative rotation of said gear in the direction in which it is driven by said spring, and a hand-operable brake normally in engagement with said element.

5. In an automatic fishing reel, the combination of a line spool, a motor spring, a train of gears connecting said spring with said spool, a rotary element constituting part of a ratchet device, a cooperating ratchet member carried by one of said gears and which opposes relative rotation of said gear in the direction in which it is adapted to be driven by said spring, and a hand-operable brake controlling the rotation of said element.

EMMETT BURGESS PERRINE.